United States Patent Office 2,871,882
Patented Feb. 3, 1959

2,871,882

SEQUENTIAL VALVE ACTUATOR

Ivar Eliasson, Stockholm, Sweden, assignor to Lidköpings Mekaniska Verkstads Aktiebolag, Lidköping, Sweden, a corporation of Sweden Application May 4, 1954, Serial No. 427,604

Claims priority, application Sweden June 15, 1953

3 Claims. (Cl. 137—622)

The present invention relates to a machine tool of the type comprising a spindle, an indexible turret movable to and from the spindle and a control device for automatically adjusting a desired operation or speed of operation, such as the feed speed of the turret or the speed of rotation of a variable speed spindle.

According to the invention the control device comprises a drum automatically rotatable in timed relation to the indexing movement of the turret, a number of rods journalled in the drum to be turned and pre-adjusted separately, means for locking the rods in different adjusted positions in relation to the drum, each rod being provided with radially projecting members spaced axially and around the rod periphery to engage, in an adjusted operative position, the valve members of valves supplying pressure air to cylinders adapted to perform a desired adjusting operation.

The device according to the invention is particularly advantageous in connection with a machine tool in which the spindle may be driven at different speeds by way of a gear box. The operating levers of the gear box may then be connected to the piston rods of the cylinders controlled by the adjusting device. To adjust the speed of the spindle devices previously known have generally been arranged to control a motor working at varying speeds, impulses having been transmitted by way of electric relays or the like. Such a control device is very complicated and also expensive and is therefore substantially suited for automatic machines intended for great series of work pieces. The present invention, on the other hand, enables at least a partial automatization of such machines intended for small series of work pieces, as have hitherto been operated entirely by hand. By means of the control device according to the invention it is now possible to adjust not only the aforementioned spindle speed but also the feed speed of the turret as well as such working operations as chucking of the work piece, supply of cooling liquid etc.

The device according to the invention will be described more in detail hereinafter with reference to the accompanying drawings which show an embodiment.

Figure 1:
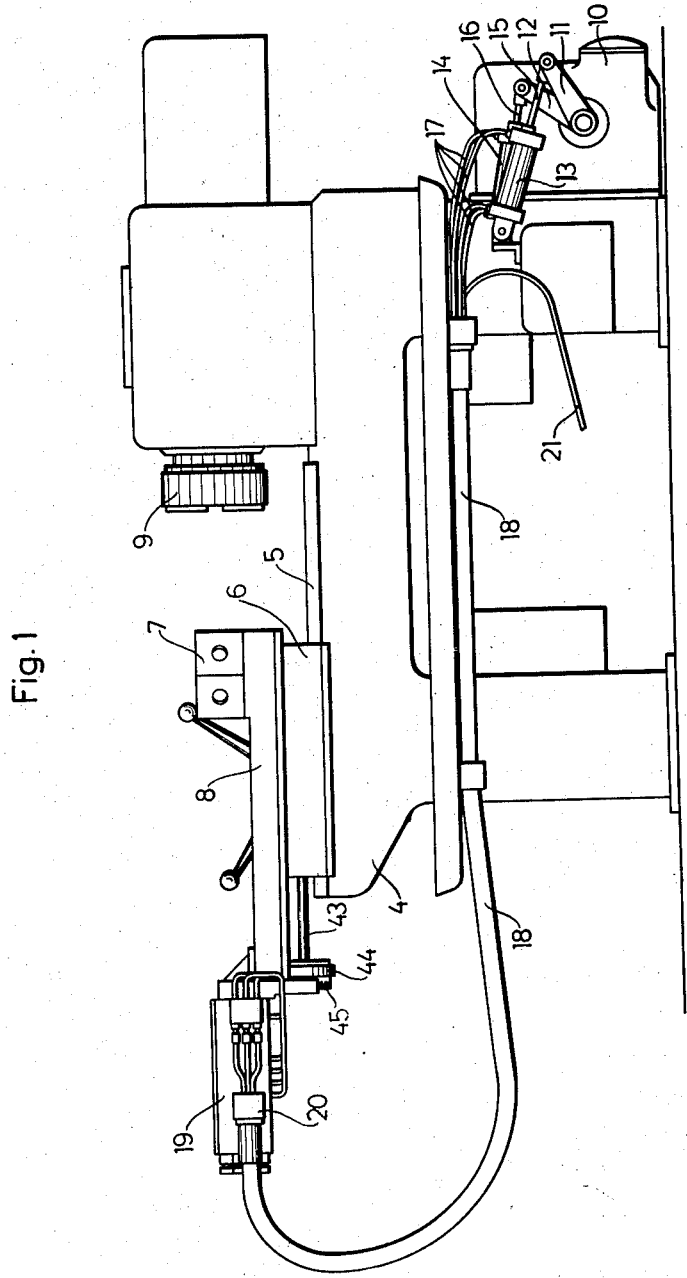
Fig. 1 shows a diagrammatic side view of a turret lathe having an automatic control device according to the invention mounted on the turret slide.

Referring to Fig. 1, 4 designates the bed of the lathe. Said bed is provided with parallel guide ways 5 extending in the length direction of the lathe. A saddle 6 is slidable on said guides to be fixed in a desired position. A slide 8 carrying a turret 7 is mounted on the saddle 6 and slidable to and from a chuck 9 fixed to the end of the spindle. The spindle is driven by a motor, not shown, over a gear box 10 which is operated in a known way by means of two levers 11 and 12. Each lever is rockable between two operative end positions, and by combining such different end positions of the two levers four gear ratios, i. e. four different working speeds for the spindle, are obtained in the known way. According to the invention, two double-acting pneumatic cylinders 13 and 14 respectively are provided for adjusting said levers 11, 12, the piston rods 15 and 16 respectively of said cylinders being hinged to the levers. Pressure air conduits 17 lead to both ends of each of the two cylinders 13, 14 from impulse valves mounted on the slide 8 close to the control device, as will be described hereinafter. Since the slide is movable, the conduits must be of a flexible material, conveniently rubber hoses, As a protective measure said conduits are encased in a common tubular, flexible envelope 18 suspended below the bed 4 and bent in a loop upwards to the casing 19 of the control device, where the conduits extend through a sleeve 20 fastened to the outside of said casing. A conduit 21 from a source of compressed air is also led through the protective tube 18.

Figure 2:
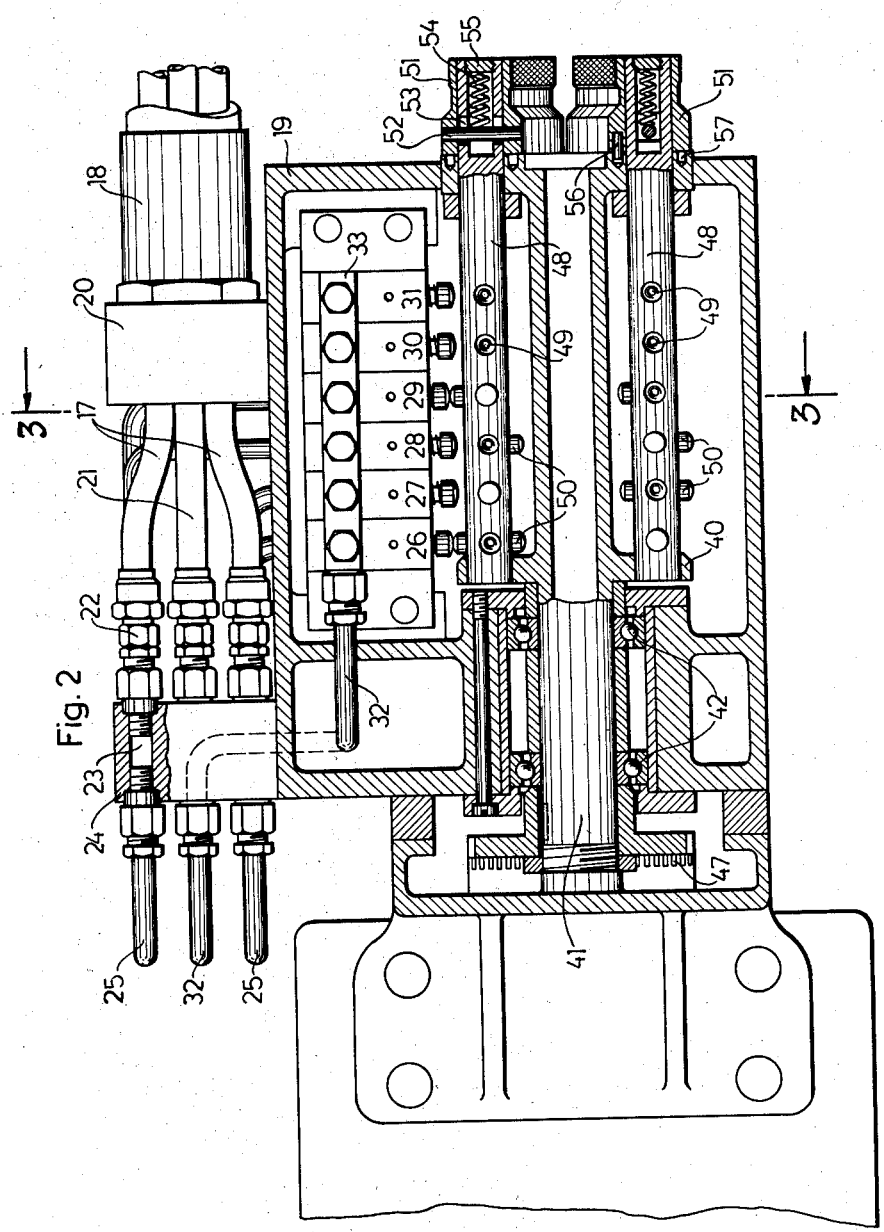
Fig. 2 shows a horizontal section through the control device.
Figure 3:
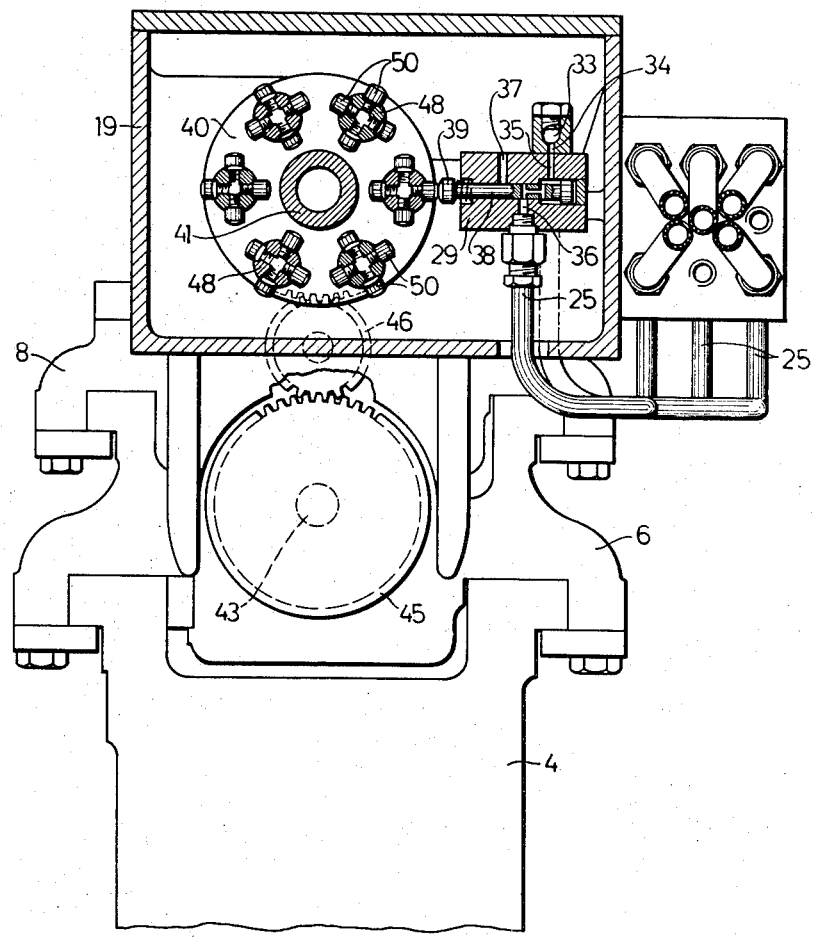
Fig. 3 shows a vertical section through the same device approximately along the line 3—3 in Fig. 2.

As seen in Fig. 2 the conduits emerging from the sleeve 20 are coupled by means of nipples 22 to channels 23 in a block 24 likewise mounted at the outside of the casing 19. Conduits 25 lead from the opposite ends of the channels to the impulse valves. In the embodiment shown six such valves 26, 27, 28, 29, 30 and 31, preferably so-called two-way valves, are mounted close to each other in horizontal alignment within the casing 19. A conduit 32 communicating with the conduit 21 from the source of pressure air by way of one of the channels 23 is coupled to a distribution pipe 33 mounted across all the valves. Said pipe 33 is provided with branch outlets, one connected to each valve. The construction of the valves is to be seen from the longitudinal section through the valve 29 in Fig. 3. The branch outlet 34 from the pipe 33 is connected to an inlet 35 of the valve 29. An outlet 36 at the underside of the valve housing is connected to one of the conduits 25 communicating with one of the conduits 17 to the pneumatic cylinders, and another outlet 37 at the top side of the valve housing is in communication with the surrounding atmosphere. The valve member consists of a movable piston 38, the outer end of which is provided with a push button 39, and adjustment is effected in the known way by pushing the piston against the action of a spring. When the push button 39 is not actuated, the piston 38 is in its outer end position, so that the conduit 25 to the working cylinder communicates with the atmosphere through the outlet 37, while the inlet 35 from the source of compressed air is closed. When the button 39 is pushed in, the outlet 37 to the atmosphere is instead closed and the conduit from the source of compressed air is connected to the conduit leading to the cylinder.

The first two impulse valves in the rows 26 and 27, may be coupled each to one of the conduits leading to the two ends of one of the cylinders, say cylinder 13, to supply pressure air for moving the double-acting piston into one of its end positions. Of course, these valves are not to be actuated simultaneously. In the same way, the two following valves 28 and 29 may be coupled to conduits leading to the two ends of the other cylinder 14, while the two remaining valves 30 and 31 have been given no function in the embodiment shown but only indicate the possibility of utilizing the device for further indexing operations.

A drum 40 with pre-adjustable members is mounted close to the row of impulse valves 26–31. The drum which is to be turned in timed relation to the indexing movement of the turret 7, has a shaft 41 projecting from one of its ends. Said shaft 41 is journalled in ball bearings 42 clamped in an axle journal formed in the casing 19. As known per se, a bevelled gear on the lower end of the vertical shaft of the turret 7 engages a corresponding bevelled gear on a horizontal shaft 43 which extends backwards in the longitudinal direction of the lathe within a space in the saddle. The rear portion of the shaft 43 extends through a bearing cap 44 (Fig. 1) fixed to the underside of the slide 8, and the shaft end projecting through said cap carries a gear 45 (see also Fig. 3) engaging a smaller intermediate gear 46. The latter, in turn, drives a gear 47 mounted on the shaft 41 of the drum 40 and having the same size as the gear 45. Thus, when the turret is turned one revolution, the drum 40 will also be turned exactly one revolution. It is postulated that the turret has six index positions, and thus the drum 40 is turned one sixth of a revolution as the turret is rotated from an index position to the next.

The pre-adjustable members mounted within the drum consist of six spindles or rods 48 placed symmetrically around the axis of the drum in spaced relation to each other. One rod cooperates with each side of the turret in such a way that the rod corresponding to the indexed side of the turret is always positioned in front of the impulse valves. Each rod 48 contains radial holes 49 arranged in four longitudinal rows forming right angles to each other around the rod. One hole in each row is placed in the same vertical plane as the push button of one of the impulse valves 26-31. The holes are threaded to receive screws having somewhat rounded heads or knobs 50 which project radially to actuate the push buttons of the confronting impulse valves.

The rods 48 are rotatably journalled in the drum to be locked in an adjusted turning position. As apparent from Fig. 2 the rod ends project through one end surface of the drum. Each rod end is provided with an axial boring and is further surrounded by a sleeve 51 knurled externally. A pin 52 is inserted diametrically through the sleeve 51 and through longitudinal slots 53 in the tubular end of the rod. A pressure spring 54 placed within the boring has one end supported by the pin 52 and its other end resting against a screw lid 55 closing the boring. The sleeve end turned towards the drum has fixed to it a projecting pin 56 which may be introduced into one of four corresponding borings 57 provided in the end surface of the drum and evenly spaced around the rod. To set the rod in another turning position the sleeve 51 is drawn outwards against the action of the spring to release the pin 56 from its engagement in a boring 57, whereby the rod may be turned into said other position in which the sleeve is let loose to allow the pin to snap into a boring and again lock the rod. Of course, the four locking positions are arranged such that in each position a row of holes 49 in the rod 48 will be positioned exactly before the push buttons of the impulse valves. The locking positions are conveniently numbered 1-4 in conformity with the four different speeds of rotation of the spindle.

As mentioned above, the different speeds of the spindle may be adjusted by means of the two levers 11 and 12. This means that one of the valves 26 or 27 controlling the cylinder 13 must be actuated simultaneously with one of the valves 28 and 29 controlling the cylinder 14. Four combinations are possible for the valves, i. e. (a) 26 and 28, (b) 26 and 29, (c) 27 and 28, and (d) 27 and 29, and the knobs 50 are therefore inserted in the holes of the rods 48 in accordance with this table. In Fig. 2, the rod 48 positioned in front of the valves is so turned that knobs 50 push in the buttons of the valves 26 and 29. As shown in Fig. 1, this has the result that the piston rod 15 of the cylinder 13 has been moved to its outer end position in rocking the lever 11 to the right, while the piston rod 16 of the cylinder 14 has been moved to its inner position in rocking the lever 12 to the left.

Thus, when using the machine tool described above it is possible by turning the rods 48 in relation to the drum 40 to adjust in advance the spindle speed desired in connection with each working operation, said speed being automatically obtained as soon as the turret has been indexed in a new working position. When the drum 40 rotates from one indexed position to another, the valve buttons actuated by the knobs are released whereby the pressure air in the cylinders is exhausted through the outlets of the valves in question and the cylinders are then ready for another working operation.

The embodiment described above and shown in the drawings is only intended as an example. Thus, the device may instead be arranged to control the feed speed of the turret, or it may control the speeds of the spindle as well as the speeds of the turret. Also a separate drum may be arranged for each of these purposes. Other applications are, of course, also possible. The control device need not necessarily be mounted on the slide but may be placed on a firm support, in which case the shaft 43 is made slidable in axial direction in relation to the gear 45. By such an arrangement the repeated bending of the pressure air conduits is avoided. On the other hand, it would hardly be possible to avoid some play between the members slidable in relation to each other.

What I claim is:

1. A multiple control valve assembly for a machine tool comprising, in combination, a rotatable spool-like element having a stem with an annular flange at each end, a plurality of rods mounted between said flanges parallel to said stem, each rod being separately rotatable for circumferential adjustment in said element, means for locking each rod in any of a plurality of selected adjusted positions, a valve unit comprising a plurality of valves each adapted to communicate with a source of air under pressure and with the atmosphere, each valve including a slidable piston having an extension directed toward said spool-like element, said rods being provided with radially-projecting, axially-spaced elements each positioned in radial alignment with the extension of one of said valve members for selective engagement with said valve members upon rotation of said spool-like element, said projecting elements being adjustable into different positions relative to said extensions.

2. A multiple control valve assembly for a machine tool comprising, in combination, a rotatable spool-like element having a stem with an annular flange at each end, a plurality of rods mounted between said flanges parallel to said stem, each rod being separately rotatable for circumferential adjustment in said element, means for locking each rod in any of a plurality of selected adjusted positions, a valve unit comprising a plurality of valves each adapted to communicate with a source of air under pressure and with the atmosphere, each valve including a slidable piston having an extension directed toward said spool-like element, the extensions of said valves being disposed in a row extending axially with respect to said rods and parallel thereto, said rods being provided with a plurality of axially spaced-apart series of circumferentially spaced-apart apertures, and radially-projecting elements removably disposed in said apertures and positioned in radial alignment with the extension of one of said valve members for selective engagement with said valve members upon rotation of said spool-like element, said projecting elements being adjustable into different positions relative to said extensions.

3. A multiple control valve assembly comprising, in combination, a rotatable spool-like element having a stem with an annular flange at each end, a plurality of rods mounted between said flanges parallel to said stem, each rod being separately rotatable for circumferential adjustment in said element, means for locking each rod in any of a plurality of selected adjusted positions, a valve unit comprising a plurality of valves each adapted to communicate with a source of air under pressure and with the atmosphere, each valve including a slidable piston having an extension directed toward said spool-like element, the extensions of said valves being disposed in a row extending axially with respect to said rods and parallel thereto, said rods being provided with radially-projecting, axially-spaced elements each removably positioned in radial alignment with the extension of one of said valve members for selective engagement with said valve members upon rotation of said spool-like element, said projecting elements being adjustable into different positions relative to said extensions.

References Cited in the file of this patent

UNITED STATES PATENTS

| | | |
|---|---|---|
| 1,811,396 | Jackson | June 23, 1931 |
| 2,005,822 | Burrell | June 25, 1935 |
| 2,352,185 | Bullard | June 27, 1944 |
| 2,467,461 | Blanding | Apr. 19, 1949 |
| 2,500,798 | Bullard | Mar. 14, 1950 |
| 2,528,299 | Clark | Oct. 31, 1950 |
| 2,677,285 | Volk | May 4, 1954 |
| 2,783,775 | Fullwood | Mar. 5, 1957 |